3,211,741
N-(PYRIDYL ALKYLENE)-2-PROPYNYLAMINES
William Brady Martin and Leo Ralph Swett, both of Waukegan, Ill., assignors to Abbott Laboratories, North Chicago, Ill., a corporation of Illinois
No Drawing. Filed Oct. 27, 1961, Ser. No. 148,041
11 Claims. (Cl. 260—296)

The present invention is directed to new propynylamines corresponding to the formula

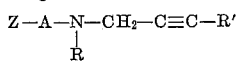

and their non-toxic, acid-addition salts as well as to methods for their preparation. In this and succeeding formulas, Z represents pyridyl, naphthyl, anthryl, furyl, thienyl, tetrahydrofuryl, piperidyl, 5-methylisoxazyl or 3,4-methylenedioxyphenyl; A represents a straight or branched loweralkylene radical; R represents hydrogen or methyl and R' represents hydrogen, loweralkyl or benzyl. The terms "loweralkyl" and "loweralkylene" as employed herein refer to the alkyl and alkylene radicals containing from 1 to 6 carbon atoms, inclusive.

The new compounds in their free base form are colorless liquids somewhat soluble in many organic solvents and of very low solubility in water. The liquid bases can be best isolated in the form of their solid salts such as the hydrobromides, hydrochlorides, benzoates, sulfates, phosphates, citrates, acetates, lactates, salicylates, succinates, fumarates, malates and like non-toxic salts. The salts are best prepared by reacting the free base with a stoichiometric amount of the desired organic or inorganic acid in a suitable solvent such as ethanol, acetone, ether or mixtures thereof. The amines and their non-toxic, acid-addition salts are active monoamine oxidase inhibitors and are accordingly useful in treating warm blooded animals in order to counteract the annoying symptoms of depression. In a representative operation, complete inhibition of monoamine oxidase was obtained in mice when N-(4-pyridylmethyl)-N-methyl-2-propynylamine was administered orally at a dosage of 50 mg. per kg. of body weight.

The new propynylamines wherein R' is hydrogen can be prepared by the reaction of one molecular proportion of propargyl bromide or propargyl chloride with at least one molecular proportion of a cyclic amine of the formula

Z—A—NHR preferably in an inert, organic solvent such as carbon tetrachloride, chloroform, methylene chloride, methanol, ethanol, benzene, ether or acetone. A hydrohalide acceptor such as potassium carbonate or triethylamine is usually employed. The reaction takes place smoothly at from room temperature to the reflux temperature of the reaction mixture with the formation of the desired product and amine hydrohalide of reaction.

In practice, the propargyl halide is added slowly to the amine and the hydrohalide acceptor, if employed, dispersed in the reaction solvent. If desired, the order of addition of the reactants can be reversed. In either case, the addition is carried out with stirring and under the aforementioned temperature conditions. When the reaction is complete, the solid salts formed are removed by filtration and washed with acetone. Upon removal of the solvent, the residue is fractionally distilled under reduced pressure to obtain the desired product as the free base which can be treated with ethereal hydrogen chloride at room temperature to obtain the solid HCl salt.

The propynylamines wherein R' is loweralkyl or benzyl are prepared by the reaction of equimolecular proportions of a benzyl halide or loweralkyl halide with the sodium salt of an amine of the formula

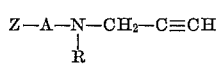

in ammonia at room temperature or below. Upon evaporation of the ammonia, the residue is fractionally distilled to obtain the desired propynylamine.

The examples which follow illustrate the invention and are not to be construed as limitations thereof.

*Example 1.—N-(4-pyridylmethyl)-N-methyl-2-propynylamine*

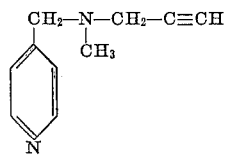

To a mixture of 49.7 grams (0.41 mole) of N-methyl-4-pyridylmethylamine and 43.5 grams (0.41 mole) of sodium carbonate in 300 ml. of acetone was added slowly with stirring at room temperature 48.8 grams (0.41 mole) of propargyl bromide in 100 ml. of acetone. The resulting mixture was refluxed for 8 hours. The acetone was then removed and the residue treated with water. The aqueous mixture was extracted twice with ether and the ether extract dried over calcium sulfate. The ether was removed under vacuum and the residue fractionally distilled under reduced pressure to obtain the desired amine product as a colorless liquid boiling at 79° C. at 1.2 mm. pressure. A portion of the free base was treated with ethereal hydrogen chloride at room temperature to obtain the corresponding HCl salt which after recrystallization from ethyl alcohol melted at 183°–185° C. and was found to contain 11.90% nitrogen compared to the calculated value of 12.02% nitrogen.

In a similar manner employing acetone as a reaction medium, other cyclic amines shown in the following table were reacted with propargyl bromide to obtain the corresponding cyclic N-methyl-2-propynylamines which when reacted with ethereal hydrogen chloride produced the corresponding hydrogen chloride salts.

| Example No. | Cyclic amine Employed R—CH$_2$—NH—CH$_3$ wherein R is— | N-methyl-2-propynylamine obtained | B.P. in ° C. of amine obtained | M.P. in ° C. of HCl salt of amine obtained |
|---|---|---|---|---|
| 2 | 3,4-methylenedioxyphenyl | 3,4-methylenedioxyphenylmethyl | 112/0.8 mm | 194 |
| 3 | 1-naphthyl | 1-naphthylmethyl | 104/0.15 mm | 192 |
| 4 | 5-methylisoxazyl | 5-methylisoxazylmethyl- | 90/2.5 mm | 159 |
| 5 | 9-anthryl | 9-anthrylmethyl | | 180 |
| 6 | 2-furyl | 2-furylmethyl | 70/4 mm | |
| 7 | 2-naphthyl | 2-naphthylmethyl | 115/0.4 mm | 155 |
| 8 | 2-pyridyl | 2-pyridylmethyl | 97/4 mm | 177 |
| 9 | 3-pyridyl | 3-pyridylmethyl | 100/3 mm | 178 |

By reacting propargyl chloride or propargyl bromide with an amine of the formula

R—CH$_2$—NH$_2$ wherein R is any of the radicals shown in the foregoing examples, there is obtained the corresponding unmethylated propynylamines of the formula

R—CH$_2$—NH—CH$_2$—C≡CH

In like manner, 2-tetrahydrofurylmethylamine, 2-(tetrahydrofurylmethyl)methylamine, 2-thienylmethylamine or 2-(thienylmethyl)methylamine can be reacted with propargyl bromide to obtain respectively, N-2-tetrahydrofurylmethyl - 2 - propynylamine, N -2 - tetrahydrofurymethyl - N - methyl - 2 - propynylamine, N - 2 - thienylmethyl - 2 - propynylamine and N - 2 - thienylmethyl - N-methyl-2-propynylamine.

*Example 10.—N-1-naphthylethyl-2-propynylamine*

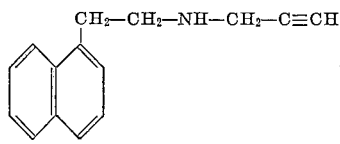

One mole of propargyl bromide is added portionwise with stirring to two moles of 1-naphthylethylamine dispersed in 200 ml. of methylene chloride at room temperature. The reaction mixture is then refluxed for 4 hours to complete the reaction as evidenced by the precipitation of the by-product 1-naphthylethylamine hydrobromide as a white solid. The amine hydrobromide is separated by filtration and the filtrate dried over anhydrous magnesium sulfate. Upon removal of the solvent and distillation of the residue under reduced pressure, the desired product is obtained as a colorless liquid having a molecular weight of 209.

In like manner, other cyclic amines can be reacted with propargyl bromide to obtain the corresponding cyclic-2-propynylamines or cyclic - N-methyl-2-propynylamines. Typical cyclic amines which can be employed are:

3-(2-naphthyl)propylamine
4-(2-furyl)butylamine
N-methyl-1-(9-anthryl)ethylamine
1-methyl-2-(3-pyridyl)ethylamine
1-ethyl-4-(2-thienyl)butylamine Thus, the reaction of propargyl bromide with N-methyl-2 - (2 - pyridyl)ethylamine, N-methyl-2-(4-pyridyl)ethylamine or N - methyl-1-methyl-2-(1-piperidyl)ethylamine will produce N - (2-pyridylethyl)-N-methyl-2-propynylamine boiling at 150° C. at 30 mm. pressure, N-(4-pyridylethyl)-N-methyl-2-propynylamine boiling at 153° C. at 20 mm. pressure and N-[1-methyl-2-(1-piperidyl) ethyl]-N-methyl-2-propynylamine boiling at 115° C. at 11 mm. pressure.

*Example 11.—1-(N-4-pyridylmethyl-N-methylamino)-2-hexyne*

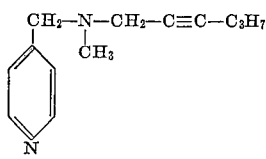

To one mole of sodamide in 500 ml. of liquid ammonia is added with stirring one mole of N-(4-pyridylmethyl)-N-methyl-2-propynylamine to form the sodium salt of said amine. Thereafter, one mole of propyl bromide is added dropwise and the reaction mixture is stirred below room temperature for 2 hours. The ammonia is then evaporated and the residue taken up in water. The water mixture is extracted with ether, the extract dried and fractionally distilled to obtain the desired product as a colorless liquid having a molecular weight of 202.

In the same manner any of the cyclic propynylamines prepared in Examples 1–9 can be reacted with benzyl bromide or a loweralkyl bromide to obtain the corresponding benzyl or loweralkyl derivatives.

What we claim is:

1. A compound selected from the group consisting of cyclic propynylamines of the formula

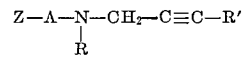

and their non-toxic, acid-addition salts in which Z is pyridyl, A is a loweralkylene radical, R is a member of the group consisting of hydrogen and methyl and R' is a member of the group consisting of hydrogen, loweralkyl and benzyl.

2. N - (4 - pyridylmethyl) - N - methyl - 2 - propynylamine.

3. N - (3 - pyridylmethyl) - N - methyl - 2 - propynylamine.

4. N - (2 - pyridylmethyl) - N - methyl - 2 - propynylamine.

5. 1 - (N - 4 - pyridylmethyl - N - methylamino) - 2-hexyne.

6. N - (2 - pyridylethyl) - N - methyl - 2 - propynylamine.

7. N - (4 - pyridylethyl) - N - methyl - 2 - propynylamine.

8. A method for the preparation of a compound of the formula

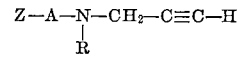

in which Z is pyridyl, A is a loweralkylene radical and R is a member of the group consisting of hydrogen and methyl, which comprises reacting one molecular proportion of propargyl bromide with at least one molecular proportion of a compound of the formula

Z—A—NHR wherein Z, A and R are as previously defined in an inert, organic solvent at from room temperature to the reflux temperature of the reaction mixture.

9. A method as claimed in claim 8 in which the reaction is carried out in the presence of a hydrohalide acceptor.

10. A method for the preparation of a compound of the formula

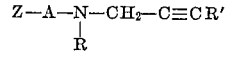

wherein Z is pyridyl, A is a loweralkylene radical, R is a member of the group consisting of hydrogen and methyl and R' is a member of the group consisting of loweralkyl and benzyl, which comprises reacting in liquid ammonia a compound of the group consisting of loweralkyl bromides and benzyl bromide with a compound of the formula

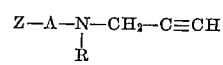

wherein Z, A and R are as previously defined.

11. A method as claimed in claim 10 in which equimolecular proportions of the reactants are employed and the reaction is carried out at room temperature.

References Cited by the Examiner

UNITED STATES PATENTS 3,106,553  10/63  Dawson _____ 260—296

WALTER A. MODANCE, *Primary Examiner.*

NICHOLAS S. RIZZO, *Examiner.*